United States Patent [19]
Sloan, Jr.

[11] Patent Number: 5,880,319
[45] Date of Patent: *Mar. 9, 1999

[54] METHOD FOR CONTROLLING CLATHRATE HYDRATES IN FLUID SYSTEMS

[75] Inventor: Earle Dendy Sloan, Jr., Golden, Colo.

[73] Assignee: Colorado School of Mines, Golden, Colo.

[ * ] Notice: The term of this patent shall not extend beyond the expiration date of Pat. No. 5,432,292.

[21] Appl. No.: 248,477

[22] Filed: May 25, 1994

Related U.S. Application Data

[63] Continuation-in-part of Ser. No. 83,108, Jun. 24, 1993, Pat. No. 5,432,292, which is a continuation-in-part of Ser. No. 979,588, Nov. 20, 1992, Pat. No. 5,420,370.

[51] Int. Cl.$^6$ ............................... C07C 7/20; F17D 1/05
[52] U.S. Cl. .................... 585/15; 585/950; 137/3; 137/13; 166/310; 166/371
[58] Field of Search ............... 585/15, 950; 137/3, 137/13; 166/310, 371

[56] References Cited

U.S. PATENT DOCUMENTS

| | | | |
|---|---|---|---|
| 3,096,383 | 7/1963 | Hann | 585/950 |
| 3,213,593 | 10/1965 | Hendrix | 55/32 |
| 3,348,614 | 10/1967 | Sinclair et al. | 166/310 |
| 3,644,107 | 2/1972 | Clark | 585/950 |
| 3,768,565 | 10/1973 | Persinski et al. | 166/308 |
| 4,057,533 | 11/1977 | Hort et al. | 260/67.5 |
| 4,132,535 | 1/1979 | Rivers, Jr. et al. | 55/23 |
| 4,456,067 | 6/1984 | Pinner | 166/279 |
| 4,471,097 | 9/1984 | Uhl et al. | 526/240 |
| 4,579,779 | 4/1986 | Diaz | 166/267 |
| 4,609,476 | 9/1986 | Heilweil | 252/8.55 |
| 4,644,020 | 2/1987 | Stahl | 522/79 |
| 4,856,593 | 8/1989 | Matthews et al. | 106/310 |
| 4,915,176 | 4/1990 | Sugier et al. | 166/371 |
| 4,951,921 | 8/1990 | Stahl et al. | 252/8.551 |
| 4,973,775 | 11/1990 | Sugier et al. | 585/15 |
| 5,055,178 | 10/1991 | Sugier et al. | 208/188 |
| 5,076,364 | 12/1991 | Hale et al. | 166/310 |
| 5,076,373 | 12/1991 | Hale et al. | 175/40 |
| 5,083,622 | 1/1992 | Hale et al. | 175/40 |
| 5,109,042 | 4/1992 | Stephens | 524/166 |
| 5,127,231 | 7/1992 | Larue et al. | 62/20 |
| 5,204,320 | 4/1993 | Patel et al. | 507/121 |
| 5,244,878 | 9/1993 | Sugier et al. | 507/90 |
| 5,248,665 | 9/1993 | Hale et al. | 507/136 |
| 5,331,105 | 7/1994 | Duncum et al. | 585/800 |
| 5,420,370 | 5/1995 | Sloan, Jr. | 585/15 |
| 5,432,292 | 7/1995 | Sloan, Jr. | 585/15 |
| 5,491,269 | 2/1996 | Colle et al. | 585/950 |

FOREIGN PATENT DOCUMENTS

| | | |
|---|---|---|
| 0115836 A3 | 8/1984 | European Pat. Off. . |
| 0 457 375 A1 | 11/1991 | European Pat. Off. . |
| 74 24886 | 2/1975 | France . |
| 2 618 876 | 2/1989 | France . |
| 2 697 264 | 4/1994 | France . |
| 3439797 A1 | 5/1985 | Germany . |
| WO 83/02449 | 7/1983 | WIPO . |
| WO 93/25798 | 12/1993 | WIPO . |

*Primary Examiner*—Anthony Mc Farlane
*Assistant Examiner*—Walter D. Griffin
*Attorney, Agent, or Firm*—Sheridan Ross & McIntosh

[57] ABSTRACT

Discussed is a process for preventing clathrate hydrate masses from detrimentally impeding the possible flow of a fluid susceptible to clathrate hydrate formation. The process is particularly useful in the natural gas and petroleum production, transportation and processing industry where gas hydrate formation can cause serious problems. Additives preferably contain one or more five member, six member and/or seven member cyclic chemical groupings. Additives include polymers having lactam rings. Additives can also contain polyelectrolytes that are believed to improve conformance of polymer additives through steric hinderance and/or charge repulsion. Additional additives include alkoxy compounds, and particularly those comprising ethoxy and or propoxy polymer blocks. Further additives include alcohols and oxazoline polymers which are preferably used in combination with polymers having lactam rings. Additives are useful in controlling clathrate hydrates in highly saline aqueous liquids.

22 Claims, No Drawings

METHOD FOR CONTROLLING CLATHRATE HYDRATES IN FLUID SYSTEMS

CROSS-REFERENCE TO RELATED APPLICATIONS

This application is a continuation-in-part of U.S. patent application Ser. No. 08/083,108 by Sloan, Jr., filed Jun. 24, 1993, now U.S. Pat. No. 5,432,292 which is a continuation-in-part of U.S. patent application Ser. No. 07/979,588 by Sloan, Jr., filed Nov. 20, 1992, now U.S. Pat. No. 5,420,370.

FIELD OF THE INVENTION

The present invention involves a method and chemicals for controlling problems that can be caused by clathrate hydrates, and particularly by gas hydrates, in fluid systems.

BACKGROUND OF THE INVENTION

Clathrate hydrates are crystalline compounds which occur when water forms a cage-like structure around guest molecules. Clathrate hydrates, especially in the hydrocarbon industry, are often referred to as gas hydrates, or simply as hydrates. Gas hydrates of interest to the hydrocarbon industry, particularly with respect to producing, transporting, and processing of natural gas and petroleum fluids, are composed of water and the following eight guest molecules: methane, ethane, propane, isobutane, normal butane, nitrogen, carbon dioxide, and hydrogen sulfide. Other guest molecules capable of forming clathrate hydrates, although not normally of significant interest to the hydrocarbon industry, include nitrous oxide, acetylene, vinyl chloride, methyl bromide, ethyl bromide, cyclopropane, methyl mercaptan, sulfur dioxide, argon, krypton, oxygen, xenon, trimethylene oxide, and others. Clathrate hydrate formation is a possibility any place water exists in the vicinity of such molecules, both naturally and artificially, at temperatures above 32° F. and below 32° F. when the pressure is elevated.

It is primarily due to their crystalline, insoluble, non-flowing nature that hydrates have been of interest to industry. They have been considered a nuisance, because they block transmission lines, plug Blow Out Preventors, jeopardize the foundations of deepwater platforms and pipelines, collapse tubing and casing, and foul process heat exchangers and expanders. Common examples of preventive measures are found in the regulation of pipeline water content, unusual drilling mud compositions, and large quantities of methanol injection into pipelines.

Hydrates normally form in one of two small, repeating crystal structures. Structure I (sI), a body-centered cubic structure, forms with natural gases containing molecules smaller than propane. Structure II (sII), a diamond lattice within a cubic framework, forms when natural gases or oils contain molecules larger than ethane but smaller than pentane; this structure represents hydrates which commonly occur in hydrocarbon production and processing conditions. Also, at least one other repeating crystal structure is known to exist, and additional structures theoretically could exist.

The structures of both sI and sII are given with reference to a water molecule skeleton, in which guest molecules are encaged, composed of a basic "building block" cavity which has twelve pentagonal faces given the abbreviation $5^{12}$. By linking the vertices of $5^{12}$ cavities one obtains sI, while linking the faces of $5^{12}$ cavities results in sII. The regions between the linked $5^{12}$ cavities in repeating crystal structures are larger cavities which contain twelve pentagonal faces and either two or four hexagonal faces: $5^{12}6^2$ for sI and $5^{12}6^4$ for sII. The water molecules around a cavity are held in place by hydrogen bonds, which attach water molecules to each other to form the cavity. Inside each cavity resides a maximum of one guest molecule. Cavities other than the $5^{12}, 5^{12}6^2$, and $5^{12}6^4$ cavities, just described, could exist in repeating crystal structures other than sI and sII. Any cavity, however, should have exactly twelve pentagonal faces. Additional information concerning clathrate hydrates, and particularly gas hydrates, can be found in Sloan, *Clathrate Hydrates of Natural Gases*, M. Dekker, N.Y., 1990, the contents of which are incorporated herein in its entirety.

There are four common means of inhibiting formation of or dissociating hydrates, namely: 1) removing one of the components, either the guest molecule or water, 2) heating the system beyond the hydrate formation temperature at a given pressure, 3) decreasing the system pressure below hydrate stability at a given temperature, and 4) injecting an inhibitor such as methanol or glycol to alter hydrate stability conditions so that higher pressures and lower temperatures are required for hydrate stability. The above four common techniques are termed thermodynamic inhibition, because they remove the system from thermodynamic stability, by changes in composition, temperature, or pressure. While the system is kept outside thermodynamic stability conditions, hydrates can never form.

Recently, new chemical treatments have been proposed for controlling clathrate hydrate problems. For Example, in European Patent Office Publication No. 0457375A1, published Nov. 21, 1991, use of alkyl aryl sulphonic acids is proposed for preventing or retarding the formation of hydrates or for reducing the tendency of hydrates to agglomerate. Additionally, International Publication No. WO 93/25798, published Dec. 23, 1993, proposes the use of polymers of N-vinyl-2-pyrrolidone for inhibiting the growth and/or agglomeration of gas hydrate crystals.

Also, in U.S. Pat. No. 4,915,176 by Sugier et al., issued Apr. 10, 1990, a method is proposed for using amphophilic compounds, having a hydrophilic part and a lipophilic part, which are mixed with a fluid to be transported to lower the gas hydrate formation temperature and/or to modify the mechanism of formation of such hydrates. It is reported that such compounds disperse the gas hydrates in the fluid and then prevent their agglomeration. However it is believed that the process would not be effective in a fluid system containing a continuous aqueous liquid phase, that is, for example, an aqueous liquid phase that is not dispersed throughout a continuous organic liquid phase such as in a water-in-oil type emulsion. Therefore, that process would not be effective, for example, in a fluid system containing both a gaseous and an aqueous liquid phase, but containing no organic liquid phase, or a fluid system comprising significantly more aqueous liquid phase than organic liquid phase.

Many of these recently proposed chemical treatments are expensive due to the high cost of the chemicals and/or the relatively low effectiveness of the chemicals. There is a need for new, more effective treating chemicals and less expensive treating methods to address clathrate hydrate problems in fluid systems, particularly those encountered in producing, transporting, and processing petroleum and natural gas fluids.

SUMMARY OF THE INVENTION

One object of the present invention is to provide a process for preventing clathrate hydrate masses in a fluid stream from impeding flow of the fluid stream, particularly with respect to fluid streams encountered in the hydrocarbon industry such as with the production, transportation and processing of petroleum and natural gas fluids.

Another object is to provide an economical process for preventing clathrate hydrate problems in fluid systems.

Another object is to provide additives for use in controlling clathrate hydrates in fluid systems, which additives have low toxicity and, therefore, their use is environmentally desirable.

Another object of the invention is to provide a process for preventing clathrate hydrate masses from agglomerating to form large masses in fluid systems containing a continuous aqueous liquid phase.

According to the present invention, an additive is added to a fluid system to prevent clathrate hydrate masses from forming, or to prevent clathrate hydrates that are present, or that form, in a fluid system from agglomerating or otherwise growing to form clathrate hydrate masses that would be large enough to create problems in the fluid system, such as by impeding the flow of fluids. Preferably, clathrate hydrate masses are prevented from becoming larger than the size of several repeating crystal structure units. In particular, it is believed that the additive interacts with clathrate hydrate cavities of clathrate hydrate masses in a way that prevents those cavities from participating in the formation of larger clathrate hydrate masses.

In one embodiment, clathrate hydrate masses are prevented from impeding the flow of a fluid stream by the addition of a polymeric additive. One such additive is a polymer having at least some repeating units characteristic of polymerizing or copolymerizing one or more N-vinyl lactam monomers, such as N-vinyl-2-pyrrolidone, N-vinyl-δ-valerolactam, and N-vinyl-ε-caprolactam. In another embodiment the additive comprises hydroxyethylcellulose. In a further embodiment the additive comprises a polymer having at least some repeating units characteristic of polymerizing an oxazoline monomer. In another embodiment the additive comprises a compound sold under the name "Gaffix VC-713" by International Specialty Products, or comprises a compound having similar attributes.

In another embodiment, an additive comprising at least one five member cyclic chemical group, six member cyclic chemical group and/or seven member cyclic chemical group is added to the fluid stream to prevent clathrate hydrate masses from impeding the flow and, more specifically, it is believed, to interfere with the process by which smaller clathrate hydrate masses form larger clathrate hydrate masses. In one embodiment, the cyclic chemical group is nonaromatic. In another embodiment, the cyclic chemical group comprises a heterocyclic ring, preferably including an internal amide and/or an internal ester group.

In one embodiment, the additive comprises multiple different cyclic chemical groups, preferably with a first cyclic chemical group having a different number of atoms in the ring than a second cyclic chemical group. In another embodiment, an additive comprises both a five member cyclic chemical group and a seven member cyclic chemical group.

In another embodiment, clathrate hydrate masses are prevented from impeding the flow of a fluid stream by application of an additive that has a molecular weight greater than about 3,000. Preferably, the additive is a polymer of molecular weight greater than about 10,000 more preferably greater than about 20,000, and most preferably greater than about 40,000. In one embodiment, particularly large molecular weight additives, having molecular weights of one million or more, are used.

In one embodiment, alkoxy compounds are used as additives. The alkoxy compounds preferably comprise polyethoxy and/or polypropoxy blocks. One preferred additive is a block copolymer having polyethoxy and polypropoxy blocks.

In one aspect, the effectiveness of additives can be improved by varying the chemical structure of the additives and/or by mixing the additives with other substances. Many of the polymer molecules used in additives for inhibiting hydrate formation appear to be significantly associated with one another when dissolved in an aqueous solution. Also, individual polymer molecules appear to exhibit a compact molecular conformation in solution. The significant association of molecules and the compact conformation of individual molecules both tend to reduce the effectiveness of additives by making it difficult for some functional groups on the polymers to effectively interact with clathrate hydrate masses that may be present in a fluid. Therefore, it appears that the effectiveness of polymer additives could be improved by reducing the association of the polymers with one another and/or by attaining a more extended, and less compact conformation for the individual polymer molecules. Less polymer would be needed to provide the same level of clathrate hydrate control and costs are thereby reduced.

In one embodiment, steric hinderance and/or charge repulsion may be used to reduce association between polymer molecules and to promote extension of individual polymer molecules in an aqueous solution. In one embodiment, the additive comprises a polyelectrolyte. In another embodiment, the additive comprises a polymer having a plurality of lactam rings and a plurality of anionic groups. In one embodiment, a chemical is provided having a plurality of seven member rings and a plurality of anionic groups pendent from a polymer backbone.

Also, many additives appear to perform more effectively when mixed with another substance. In one embodiment, clathrate hydrate control polymers useful with the present invention are used together with one or more alcohols. In another embodiment, two different polymers, each having a lactam ring, are used together. In a further embodiment, a polymer having at least some repeating units characteristic of polymerizing an oxazoline monomer can be used, preferably by mixing with other additives.

In one embodiment, the additive is used in combination with a high salinity aqueous phase. The presence of a high salinity aqueous phase has, surprisingly, been found to be beneficial for use with many additives and particularly for those comprising a lactam ring.

According to the present invention, The fluid system may comprise, in addition to clathrate hydrate masses that may be present, any combination and relative proportions of a gaseous phase, an aqueous liquid phase, and an organic liquid phase. In one embodiment, the fluid system comprises an aqueous liquid phase and a gaseous phase. In another embodiment, the fluid system comprises a fluid stream that is transported by flow through a conduit. In another embodiment, the fluid system comprises one or more fluid phases from the production, transportation or processing of natural gas or petroleum fluids.

DETAILED DESCRIPTION OF THE INVENTION

In one respect, the present invention involves preventing clathrate hydrate formation or controlling the joining together of clathrate hydrate masses in fluid systems to form larger clathrate hydrate masses. The present invention also involves controlling the formation of clathrate hydrates in a fluid system to prevent large clathrate hydrate agglomerates in a fluid system. A fluid stream having clathrate hydrate masses mixed therein, or that is susceptible to the formation of clathrate hydrate masses, is contacted with an additive that prevents clathrate hydrate masses from forming a mass or masses that could impede the flow of the fluid stream. Preferably, clathrate hydrate masses no larger than several repeating crystal structure units are allowed to form. Preferably, the additive is at least partially soluble in water.

The present invention is particularly useful in the hydrocarbon industry such as with the production, transportation and processing of natural gas and petroleum. The present invention is useful, for example, to control gas hydrates that could form during extraction of natural gas and petroleum fluids through a producing well, during transportation of the extracted fluids, and during processing of the extracted fluids.

Preferably, the additive comprises at least one cyclic chemical group, also known as a ring group, in its molecular structure, and more preferably, the additive comprises a plurality of cyclic chemical groups, which can be either the same or different. More preferably the cyclic chemical group is not aromatic. A cyclic chemical group refers to an organic ring structure, which may contain only carbon atoms as members of the ring, or may contain one or more other atoms in a heterocyclic ring such as, for example, atoms of oxygen, nitrogen, sulfur, and/or phosphorus. Preferably, the cyclic group has a polar moiety, which is either a polar atom, such as oxygen or nitrogen, in the ring, or a polar substituent, such as an oxygen atom, attached to the ring, or both. More preferably, the cyclic chemical group is heterocyclic and most preferably comprises an oxygen or nitrogen atom in the ring. Preferably, the additive comprises an ester and/or an amide linkage internal to the ring of a cyclic chemical group.

It is particularly preferred that the additive comprise at least one five member cyclic chemical group and/or one six member cyclic chemical group and/or one seven member cyclic chemical group in its molecular structure. Most preferably, the additive comprises at least one seven member cyclic chemical group in its molecular structure.

Although not wishing to be bound by theory, it is believed that when guest molecules, such as those in natural gases, dissolve in water and form clathrate hydrates, that water molecules cluster around the guest molecule, in a labile, non-permanent structure which closely resembles the $5^{12}$ cavity. Two or more of these water clusters have been shown to share either vertices or faces, in the beginning of hydrate crystallization.

It is therefore possible to prevent clathrate hydrates from plugging, or otherwise impeding the flow of fluids by using a kinetic growth inhibitor to block small fluid-like species from becoming larger crystalline species.

One method of inhibition according to the process of the present invention, called kinetic inhibition, allows the system to exist in the hydrate thermodynamic stability region, but small clathrate hydrate masses are hindered from agglomerating with one another and/or from growing to form larger masses by means of small quantities of new chemical treatments. It is believed that seven member cyclic chemical structures are particularly useful because they interact with one more of the pentagonal and/or hexagonal faces of a cavity, thereby preventing those faces from participating in the formation of a larger clathrate hydrate mass.

Preferably, the additive is a polymer of molecular weight greater than about 3,000, more preferably of molecular weight greater than about 10,000, still more preferably of a molecular weight greater than about 20,000, and most preferably of molecular weight greater than about 40,000. As discussed below, some preferred polymers have molecular weights of one million or more. As used herein, polymer refers to homopolymers and copolymers. As used herein, copolymer refers to a polymer made from any number of different monomers in excess of one.

One preferred class of additives are those comprising one or more five, six and/or seven member cyclic chemical groups wherein at least one cyclic chemical group comprises an internal ester or an internal amide. Examples of cyclic groups comprising internal amides include, for example, lactams, including those with substituents. Examples of cyclic groupings comprising internal esters include lactones and substituted lactones. Additives comprising cyclic chemical groups representative of, or derived from, lactams or substituted lactams are particularly preferred. As used herein, a lactam includes any organic ring having an amide linkage internal to the ring. Such an internal amide linkage has the formula

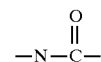

with the nitrogen atom and preferably also the carbon atom being in the ring. Particularly preferred lactam rings include 2-pyrrolidone, δ-valerolactam and/or ε-caprolactam rings, which can be used in a substituted or unsubstituted form, and individually or in combination with one another.

In one embodiment, the additive comprises a poly (N-vinyl lactam) homopolymer or copolymer. As used herein, poly(N-vinyl lactam) refers to polymers prepared using one or more monomers having a vinyl group substituted onto the nitrogen of a lactam ring. Preferred monomers are N-vinyl-2-pyrrolidone, N-vinyl-δ-valerolactam and N-vinyl-ε-caprolactam, which can be individually polymerized to make homopolymers or can be copolymerized in any combination to prepare copolymers or can be copolymerized with other suitable non-lactam-containing monomers. Other ethylenically unsaturated groups, besides the vinyl group, however, could be substituted onto the nitrogen of a lactam ring to provide other suitable monomers.

One substance that has been found to be effective as an additive is poly(N-vinyl-2-pyrrolidone), which comprises a plurality of five member cyclic groups extending from a polymer backbone. The five member cyclic groups comprise an internal amide characteristic of a lactam. Preferably, such poly(N-vinyl-2-pyrrolidone) is of molecular weight greater than about 3,000, more preferably greater than about 10,000, still more preferably greater than about 20,000, and most preferably greater than about 40,000. Poly(N-vinyl-2-pyrrolidone) is a chemical with low toxicity. Therefore, it would not cause significant environmental damage if accidentally released into the environment, such as might occur in case of a pipeline leak.

Poly(N-vinyl-2-pyrrolidone) is a polymer having a carbon backbone with the following five member cyclic group, referred to herein as Group I, such as may be derived from 2-pyrrolidone which is also called 2-pyrrolidone, or butyrolactam:

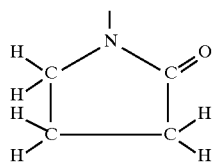

Group I

Other compounds having Group I could also be used as additives. Preferably, the additives are polymers having a molecular weight greater than about 3,000, more preferably greater than about 10,000, still more preferably greater than about 20,000 and most preferably greater than about 40,000. Group I could be incorporated into a polymer, for example, by homopolymerization of N-vinyl-2-pyrrolidone or by copolymerization with other monomers. Also, hydrogens on the 2-pyrrolidone ring could be substituted with one or more organic groups.

In one embodiment, the additive has a seven member cyclic group. One preferred seven member cyclic group is the following group, referred to herein as Group II, which is also called ε-caprolactam:

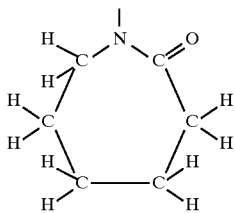

Group II

The additive is preferably a polymer, more preferably having a molecular weight greater than about 3,000, more preferably greater than about 10,000, still more preferably greater than about 20,000 and most preferably greater than about 40,000. Such a caprolactam group could, for example, extend from a polymer backbone, such as a polyvinyl backbone. Group II could be incorporated into a polymer, for example, by homopolymerization of N-vinyl-ε-caprolactam or copolymerization with other monomers. Also, hydrogens on the ε-caprolactam ring could be substituted with one or more organic groups. The ε-caprolactam ring has been found to be particularly effective for controlling clathrate hydrates and homopolymers and copolymers made from N-vinyl-ε-caprolactam are particularly preferred additives.

In one embodiment, the additive comprises a plurality of different cyclic chemical groups. Preferably, the additive comprises at least two cyclic chemical groups and more preferably, the additive comprises a first cyclic chemical group having a different number of atoms in its ring than a second cyclic chemical group. Even more preferably, the additive comprises a five member cyclic chemical group and a seven member cyclic chemical group. Preferably at least one of the cyclic chemical groups comprises an internal amide and/or an internal ester and more preferably at least two different cyclic chemical groups comprise an internal amide and/or an internal ester. Preferably, the additive is a polymer with a molecular weight greater than about 3,000, more preferably greater than about 10,000, still more preferably greater than about 20,000 and most preferably greater than about 40,000. The additive preferably is also at least partially soluble in water. In one preferred embodiment, the multiple cyclic chemical groups are such that they do not form is a part of the polymer backbone, but rather extend from the polymer backbone, such as would be the case for substituents grafted onto a polymer backbone. One such preferred additive is a copolymer having both pyrrolidone and ε-caprolactam rings, such as a copolymer between N-vinyl-2-pyrrolidone and N-vinyl-ε-caprolactam. Such a copolymer can be made from any ratio of the comonomers, but preferably is made from greater than about 25 weight percent N-vinyl-ε-caprolactam, more preferably from greater than about 50 weight percent N-vinyl-ε-caprolactam, still more preferably from greater than 65 weight percent N-vinyl-ε-caprolactam and most preferably greater than about 75 weight percent N-vinyl-ε-caprolactam.

In one embodiment, in addition to multiple cyclic chemical groups which are not a part of the polymer backbone, at least one noncyclic chemical group also extends from the polymer backbone. Such a noncyclic chemical group can comprise either a normal or a branched chain structure. Preferably, the noncyclic chemical group comprises at least one polar atom such as oxygen, nitrogen, sulfur or phosphorus, more preferably nitrogen and/or oxygen. Most preferably, such a noncyclic chemical group comprises an amino or substituted amino group.

In one embodiment, the additive comprises a five member cyclic chemical group, a seven member cyclic chemical group, and a noncyclic chemical group. Preferably, all three of these chemical groups form or are part of substituents extending from a polymer backbone. One chemical that has been found to be particularly useful comprises Group I, Group II and the following noncyclic group, referred to herein as Group III:

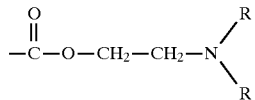

Group III

Where each R is independently hydrogen or an organic constituent. Preferably, Group III is made from polymerizing an N,N-disubstituted ethyl amino methacrylate monomer and more preferably from polymerizing 2-[dimethylamino]ethyl methacrylate, in which both of the R's in Group III are methyl groups. The polymer can be any polymer with these three chemical groups, and may be, for example, block, random, or graft copolymers. Group III could be incorporated into a polymer, for example, by copolymerization of 2-[dimethylamino]ethyl methacrylate with other appropriate monomers to form a copolymer having all of Groups I, II and III. Preferably, the polymer has a molecular weight greater than about 3,000, more preferably greater than about 10,000, still more preferably greater than about 20,000 and most preferably greater than about 40,000. Alternatively, an additive may have Group III and only one of Group I and Group II.

One specific example of a compound having all of Groups I, II and III is that sold under the name "Gaffix VC-713" by International Specialty Products which currently has a business address of 1361 Alps Road, Wayne, N.J. Gaffix VC-713 is a copolymer prepared from three monomers, which is often referred to as a terpolymer. Those three monomers are N-vinyl-2-pyrrolidone, N-vinyl-ε-caprolactam and 2-[dimethylamino]ethyl methacrylate.

Another preferred additive is hydroxyethylcellulose, which comprises six membered cyclic chemical groups. Any of the additives discussed herein, can be used together in any ratios.

In one aspect, the present invention provides a method for increasing the effectiveness of many additives discussed previously, and especially additives that comprise one or more lactam rings. With increased effectiveness, less chemical additive can be used and the cost of controlling clathrate hydrates, is correspondingly reduced.

One apparent problem with polymeric additives having organic rings, as described, is that the polymers appear to have a tendency to associate with one another when dissolved in water. Polymer molecules do not appear to be individually well dispersed in the solution. It is believed that this lack of good dispersion reduces the effectiveness of the polymers because it is difficult for some functional groups on the polymer to contact clathrate hydrate masses in such a way as to inhibit the growth of those masses.

Another apparent problem is that individual polymer molecules appear to have a tendency to exist in aqueous solution in a compact conformation. As used herein, conformation refers to the shape or arrangement in three-dimensional space that an organic molecule assumes. Allowing polymers to assume a less compacted, and more extended and open, conformation results in more effective utilization of the polymers for controlling clathrate hydrate problems. For example, the caprolactam groups on a poly (N-vinyl-ε-caprolactam) appear to have a tendency to associate with one another in an aqueous solution, thereby keeping the polymer in a compact conformation and preventing some of the ε-caprolactam rings from effectively inhibiting the growth of clathrate hydrate masses.

Certain modifications can be made to chemical additives used with the present invention to improve the effectiveness of those additives. Not to be bound by theory, it is believed that the improvement in effectiveness is due to reduced association between polymer molecules and/or to individual polymer molecules attaining a more extended, and less compact, conformation in an aqueous solution.

In one embodiment, functional ring constituents on polymers are sterically hindered to prevent their association. For example, the compound Gaffix VC-713, as previously described, comprises both pyrrolidone rings and caprolactam rings. Gaffix VC-713 is made from about 65 weight percent N-vinyl-ε-caprolactam, 25 weight percent N-vinyl-2-pyrrolidone, and 10 weight percent of 2-[dimethylamino] ethyl methacrylate. Gaff ix VC-713, however, performs as effectively in controlling clathrate hydrate problems as does an N-vinyl-ε-caprolactam homopolymer, which comprises a larger number of the N-vinyl-ε-caprolactam units per unit weight than does the Gaffix VC-713 polymer. Consequently, it may be that the presence of the pyrrolidone rings in Gaffix VC-713 provides steric hinderance to association of the caprolactam rings. This may be due to the relative greater attraction of water molecules to the pyrrolidone rings relative to the caprolactam rings. This steric hinderance may have the effect of extending the molecule more in the Gaffix VC-713 than is the case for the N-vinyl-ε-caprolactam homopolymer. Other nonionic groups could also be used to provide steric hinderance between organic ring constituents on a polymer.

Ionic groups can also be used to provide steric hinderance. The use of ionic groups also provides the added benefit of charge repulsion, which should tend to further disassociate the polymer molecules from one another and extend the individual polymer molecules in solution. Anionic groups are preferred. Such anionic groups include sulfonates, sulfinates, sulfates, phosphonates, phosphinates, phosphates, and carboxylates. Sulfonates are generally preferred. As used herein, sulfonate, sulfinate, sulfate, phosphonate, phosphinate, phosphate and carboxylate each include the respective acids, although the use of such acids is not preferred. Preferably, the ionic groups are in salt form and, more preferably in salt form with a cation of a Group IA metal or with an ammonium cation. Preferably, the ionic groups are present in the form of a polyelectrolyte.

In one embodiment, a polyelectrolyte can be mixed with one of the ring-containing hydrate control polymers as previously described. Preferably, however, the ionic groups and the ring structures useful for clathrate hydrate control are combined in a single polymer. For example, a copolymer from monomers comprising N-vinyl-pyrrolidone and sodium 2-acrylamido-2-methyl-1-propane sulfonate could be used. Such polymers that combine ring structures and ionic groups may be of very high molecular weight. The molecular weight of such polymers may be on the order of one million or more. One such high molecular weight polymer is a copolymer made from the three monomers N-vinyl-2-pyrrolidone, 2-acrylamido-2-methyl-1-propane sulfonate, and acrylamide. Polymerization of sodium 2-acrylamido-2-methyl-1-propane sulfonate gives the repeating units:

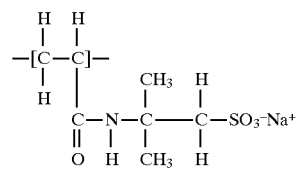

This copolymer is manufactured by Phillips Petroleum Company and sold under the name HE-300. Addition of the acrylamide monomer has the effect of producing a higher molecular weight polymer. Methacrylamide could also be used as a comonomer as could any ethylenically unsaturated compound that is copolymerizable by a free radical technique.

In another aspect, the present invention provides new chemical additives useful in preventing problems with clathrate hydrates. The chemicals are polymers comprising a polymer backbone having at least two different constituents pendent from the backbone. A first constituent comprises a seven member organic ring. A second constituent comprises an ionic group. Preferably, the ionic group is an anionic group.

Preferably, the seven member ring comprises an ester and/or an amide linkage internal to the ring. Preferably, the seven member ring is an ε-caprolactam ring.

The anionic groups are preferably sulfonates, sulfinates, sulfates, phosphonates, phosphinates, phosphates and/or carboxylates. Sulfonates are more preferred. The ionic groups are preferably associated as salts with either Group IA metal cations or an ammonium cation.

The polymers can be prepared from any ethylenically unsaturated monomers having seven member ring constituents and ionic group constituents. Preferably, the monomers are ethylenically monounsaturated to reduce possible crosslinking. One preferred polymer can be made by copolymerizing N-vinyl-ε-caprolactam with sodium 2-acrylamido-2-methyl-1-propane sulfonate. Also, other ethylenically unsaturated monomers can be used, such as acrylamide and methacrylamide monomers, which may be substituted or unsubstituted. A copolymer from the three monomers of N-vinyl-ε-caprolactam, sodium 2-acrylamido-2-methyl-i-propane sulfonate, and acrylamide is one preferred polymer additive.

Several methods for initiating free radicals for polymerizing ethylenically unsaturated monomers are known in the art. The polymers of the present invention can be prepared by these known free radical initiation polymerization methods.

Additional additives that have been found useful for controlling clathrate hydrate problems include alkoxy compounds. As used herein, alkoxy compounds include any compounds having one or more alkoxy groups, and preferably comprising one or more ethoxy and/or propoxy groups. Such alkoxy compounds may comprise a compound which has been alkoxylated through substitution to introduce one or more alkoxy groups. Alkoxy compounds also include polyethers, and particularly polyethers comprising repeating units characteristic of ring opening polymerization of ethylyne oxide and/or propylene oxide and/or their derivatives.

One preferred alkoxy additive is a polymer having first repeating units characteristic of ring opening polymerization of ethylene oxide and second repeating units characteristic of ring opening polymerization of a propylene oxide. In one embodiment, the alkoxy compound comprises one or more polyether blocks of ethoxy repeating units, characteristic of ring opening polymerization of ethylene oxide. In another embodiment, the alkoxy compound comprises one or more polyether blocks of propoxy repeating units. In one preferred embodiment, the alkoxy compound comprises one or more ethoxy polyether blocks and one or more propoxy polyether blocks. More preferably, the alkoxy compound is a block copolymer. In one embodiment, such a block copolymer is of a formula EO-PO-EO, with EO representing an ethoxy block and PO representing a propoxy block. In another embodiment, the block copolymers have the formula PO-EO-PO. Preferably, ethoxy blocks comprise at least 60 weight percent of these block copolymers, and more preferably greater than 70 weight percent.

In a further aspect, the present invention provides for the use of one or more of the previously described clathrate hydrate control additives as primary additives in combination with one or more other substances as a secondary additive. It has been found that many of the primary additives perform satisfactorily in smaller quantities when those additives are mixed with certain secondary additives. Also, many of the secondary additives are less costly and can, therefore, provide significant cost savings. Use of secondary additives is particularly useful for primary additives having one or more lactam rings.

In one embodiment, the primary additive comprises an organic ring, preferably having an amide linkage internal to the ring, such as those additives previously described. One or more primary additive is mixed with one or more alcohols, as a secondary additive, such that the primary additive and the alcohol are substantially simultaneously contacted with a fluid that is susceptible to having clathrate hydrate problems. Preferably, the primary additive and the alcohol are mixed prior to contacting the two additives with the fluid.

One benefit of using alcohols is that alcohols tend to suppress the hydrate formation temperature. It appears, however, that alcohols provide an additional benefit of improving the effectiveness of the primary additives to prevent the growth and/or agglomeration of clathrate hydrate masses once they have formed. This additional benefit may be due to reducing association between primary additive molecules and/or by promoting a greater extension of individual molecules of the primary additive in solution.

The alcohol is preferably soluble in water. More preferably, the alcohol is a $C_1$–$C_5$ monohydric or polyhydric alcohol. The most preferred alcohols are methanol, ethanol and ethylene glycol, with methanol being particularly preferred.

The alcohol can be used with primary additives in any ratio. The alcohol is preferably added in an amount that is greater than about 1 weight percent relative to water in the fluid, more preferably greater about 2 weight percent, and most preferably from about 2 weight to about 20 weight percent. The primary additive is preferably added in an amount of from about 0.1 weight percent to about 1.0 weight percent relative to water.

In another embodiment, the secondary additive comprises a nitrogen-based linkage. Preferably, the nitrogen-based linkage is an amide linkage. Such an amide linkage may be internal to a ring, such as in a lactam ring. For example, poly(N-vinyl-ε-caprolactam) can be mixed with HE-300, either of which can be the primary additive with the other being the secondary additive. Such a mixture has been found to be more effective than either of the two additives used separately. Also, mixtures of an N-vinyl-ε-caprolactam/N-vinyl-2-pyrrolidone copolymer and HE-300 are also useful for controlling clathrate hydrates. Use of a copolymer made from greater than about 75 weight percent N-vinyl-ε-caprolactam is preferred. One mixture that has been shown to be particularly effective is a mixture, relative to water, of approximately 0.25 weight percent HE-300 and 0.25 weight percent of a 75/25 by weight copolymer of N-vinyl-ε-caprolactam/N-vinyl-2-pyrrolidone. Such a mixture is effective at preventing problems with gas hydrates at a temperature of 39.2° C. and a pressure of 1500 psi for asignificant time.

The amide linkage of the added substance need not, however, be an amide linkage internal to a ring. For example, the added substance may comprise materials such as polypeptides. One preferred additive is a polymer having at least some repeating units characteristic of polymerizing an oxazoline monomer. Preferred oxazoline monomers are 2-oxazolines, which have the chemical formula

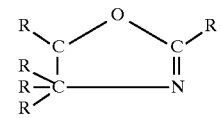

where each R can be independently hydrogen or an organic substituent. A preferred 2-oxazoline monomer is 2-ethyl-2-oxazoline which has the chemical formula

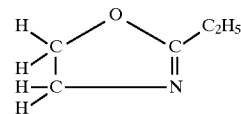

Polymerization of 2-ethyl-2-oxazoline gives a repeating unit of the following formula

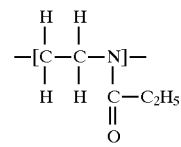

Another preferred 2-oxazoline monomer is 2-methyl-2-oxazoline. In one embodiment, at least a portion of the oxazoline repeating units are hydroly to give at least some repeating units of

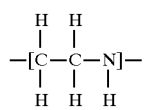

The oxazoline-based polymers can be used to replace at least a part of the primary additives. For example, a mixture, relative to water, of 0.25 weight percent poly(2-ethyl-2-oxazoline) and 0.25 weight percent poly(N-vinyl-ε-caprolactam) should be effective to prevent gas hydrate problems at a pressure of 1000 psi and 39.2° C. for a significant time.

Useful secondary additives can also be prepared from polymerization of ethylene imine by a ring opening polymerization of the ethylene imine to give the following repeating units

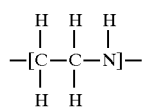

Additionally, the poly(ethyleneimine) can be treated with a substance to substitute at least some of the hydrogens of the poly(ethyleneimine). Treatment with acetyl chloride, for example, will give repeating units of the formula

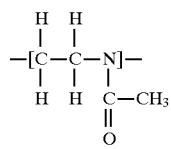

These repeating units are the same as those obtained from polymerizing 2-methyl-2-oxazoline. The number of those repeating units in the polymer, however, will vary depending upon the number of substitutions made on the nitrogen sites.

Preferably, at least some of the nitrogen-based linkages of the secondary additive comprise a tertiary amide. For example, the internal amide linkage of an N-vinyl caprolactam polymer and a polymer from 2-ethyl-2-oxazoline both have tertiary amides. A poly(ethyleneimine) treated with acetyl chloride will have some tertiary amides, the number depending upon the number of substituted sites.

The fluid system to which hydrate control additives can be added comprises any fluid or fluids comprising water and guest molecules, which water and guest molecules together can form clathrate hydrates. The fluid system may comprise any combination of one or more gaseous phase, aqueous liquid phase, and organic liquid phase, and in any proportions. Typically, the fluid system will comprise at least two fluid phases, a gaseous phase, which comprises guest molecules, and an aqueous liquid phase. Typically, a suitable fluid system comprising an organic liquid phase also comprises both a gaseous phase and an aqueous liquid phase.

The present invention is particularly useful in fluid systems comprising a continuous aqueous liquid phase. A continuous aqueous liquid phase is, for example, an aqueous phase that is not dispersed as small, emulsified droplets throughout a continuous organic phase, as would be the case in a water-in-oil type emulsion. Therefore, the present invention is particularly useful, for example, when the fluid system comprises a gaseous phase and an aqueous liquid phase in the absence of an organic liquid phase, or at least in the absence of an organic liquid phase of significant volumetric proportion relative to the aqueous liquid phase. It has been surprisingly discovered that, according to the present invention, clathrate hydrate masses in such a fluid system, containing a continuous aqueous liquid phase will nonetheless disperse in the fluid system, and in particular will disperse in the continuous aqueous liquid phase, and will not agglomerate to form a mass large enough to impede the flow of a fluid stream comprising the dispersed clathrate hydrate masses. This is particularly surprising because, in the absence of a substantial organic liquid phase, the aqueous liquid phase cannot be emulsified and dispersed throughout the organic phase to maintain dispersion of clathrate hydrates forming in small, dispersed aqueous droplets.

With the present invention, it is not necessary to disperse an aqueous liquid phase, such as throughout an organic liquid phase, to prevent agglomeration of clathrate hydrate masses. With the present invention, even in a fluid system that contains a shortage of available water relative to available guest molecules for the formation of clathrate hydrates, not all of the water will participate with guest molecules to form clathrate hydrates Rather, free water will typically remain in an aqueous liquid phase, which will have clathrate hydrate masses dispersed therein.

Based on the foregoing, it will be recognized that the present invention has wide applicability to fluid systems of varying relative proportions of gaseous, aqueous liquid, and organic liquid phases. The present invention, for example, will disperse clathrate hydrates in an aqueous phase, whether such aqueous phase is in a gas/aqueous liquid system or in a gas/aqueous liquid/organic liquid system. Also, in a gas/aqueous liquid/organic liquid system, it is not necessary that the organic liquid phase predominates over the aqueous liquid phase because it is not necessary to disperse the aqueous phase as small droplets in an emulsified form.

In one embodiment, the fluid comprises a saline aqueous liquid. The ring-containing clathrate control additives useful with the present invention have, surprisingly, been found to be effective for controlling clathrate hydrate problems in such saline aqueous liquids. Lactam-containing compounds, and preferably polymers comprising one or more lactam rings, have been found to be particularly effective in treating such saline solutions. In one embodiment, the aqueous liquid comprises greater than about 1 weight percent dissolved salt. In another embodiment the aqueous liquid comprises greater than about 2 weight percent of dissolved salt. In a further embodiment, the aqueous liquid comprises greater than about 3 weight percent of dissolved salt. In a still further embodiment, the aqueous liquid comprises greater than about 3.5 weight percent dissolved salt, such as might be found in sea water. For example, a mixture of 0.25 weight percent of a 75/25 copolymer of N-vinyl-ε-caprolactam/N-vinyl-2-pyrrolidone and 0.25 weight percent of HE-300, relative to water, has been found effective in laboratory experiments for controlling clathrate hydrates for a significant time at a pressure of 1,500 psi, a temperature of 39.2° F., and with a water phase comprising approximately 3.5 weight percent of dissolved salt.

Additionally, increasing the salt concentration up to 3.5 weight percent relative to water significantly enhances the hydrate control effectiveness of additives comprising a 5 member ring. Preferably, the additive comprises a polymer having a plurality of pyrrolidone rings, such as, for example, a homopolymer or copolymer of N-vinyl-pyrrolidone. A copolymer of N-vinyl-2-pyrrolidone preferably comprises an ε-caprolactam ring. A preferred copolymer is one made from N-vinyl-2-pyrrolidone and N-vinyl-ε-caprolactam, including the Gaffix VC-713 copolymer.

Contacting an additive with clathrate hydrates in a fluid system, according to the present invention, can be accomplished using any suitable contacting means. For example, such contacting can be effected by mixing an additive into the fluid system, such as into a flowing fluid stream. For example, an additive could be injected into a downhole location in a producing well to control clathrate hydrates in fluids being produced through that well. Likewise, an additive could, for example, be injected into the produced fluid stream at a wellhead location, or even into piping extending through a riser, through which produced fluids are transported in offshore producing operations from the ocean floor to the offshore producing facility located at or above the surface of the water. Also, an additive could be injected into a fluid stream prior to transporting that fluid stream, such as by injecting an additive into the fluid stream which is then transported, such as via subsea pipeline from an offshore producing location to an onshore processing facility.

Additives useful according to the present invention, can be normally solid, normally liquid, or normally gaseous. If such an additive is normally solid, such as is the case with many polymers, including poly(N-vinyl-2-pyrrolidone), such solid additive is preferably dissolved into a carrier liquid, so that the additive can then be injected into the fluid system in liquid form. For example, poly(N-vinyl-2-pyrrolidone), poly(N-vinyl-ε-caprolactam), copolymers of the two, Gaffix VC-713, HE-300, hydroxyethylcellulose and other additives, can be dissolved in methanol, and the methanol solution can then be injected directly into a flowing fluid stream to effect a desired contacting of the additive with clathrate hydrate masses that may form in the fluid stream during transportation, such as through a pipeline. The carrier liquid should preferably be soluble in water. Water, however, is generally not preferred as a carrier liquid because of the tendency of such water to promote additional clathrate hydrate formation in the fluid system.

Preferably, an additive is mixed with the fluid system prior to the formation of clathrate hydrates in that fluid system. The additive would then be present in the fluid system to contact clathrate hydrate masses as they first form.

Mixing of an additive into the fluid system, or contacting of an additive already in the fluid system with clathrate hydrate masses, may be aided by mechanical means, as are well known in the art, such as, for example, by using conveniently located static, in-line mixers on a pipeline. In most pipeline transportation applications, however, sufficient mixing and contacting will occur due to the turbulent nature of the fluid flow and mechanical mixing aids will not be required.

It will be recognized that the amount of primary additive required to be added to any particular fluid system will depend upon the composition of that system and the conditions of temperature and pressure to which the fluid system will be subjected. Generally, however, such additive will be added in an amount that results in from about 0.01 weight percent to be about 10 weight percent, preferably from about 0.1 weight percent to about 5 weight percent and more preferably from about 0.2% to about 0.5%, by weight, of additive relative to free water in a fluid system.

The following examples are provided for the purpose of illustrating the present invention and are not intended to limit the scope of the invention in any way.

EXAMPLE 1

This example is provided for comparison, and illustrates the formation of clathrate hydrates in an aqueous solution and growth of those clathrate hydrates into masses of sufficient size to form a clathrate hydrate plug in a fluid system.

A 15 ml test tube is filled with an aqueous solution containing 3.5 weight percent sodium chloride, relative to water, and 20 weight percent of tetrahydrofuran, also relative to water. Tetrahydrofuran is a compound capable of forming a clathrate hydrate. A stainless steel ball having an outside diameter of 0.20 inch is inserted into the test tube so that the ball can roll freely along the tube length. The test tube is sealed and placed in a water bath containing ice that is at a temperature of 0° C. A mechanical device rotates the test tube continuously end-over-end about the center point of the length of the test tube. The stainless steel ball rolls from one end of the test tube to the other during each rotation of the test tube. The test tube is visually observed while rotating in such a fashion.

The solution becomes cloudy, indicating the initiation of a clathrate hydrate phase within the tube, after about twelve minutes of rotating in the water bath. After approximately thirty minutes of rotating in the water bath, the ball completely stops rolling in the test tube, indicating that clathrate hydrates have formed a plug within the test tube.

EXAMPLE 2

This example illustrates the use of an additive to prevent aggregation of clathrate hydrates in an aqueous solution to form a clathrate hydrate plug.

The experimental procedure of Example 1 is repeated, except that poly(N-vinyl-2-pyrrolidone) is added to the aqueous solution in an amount of 0.5 percent by weight, relative to water. The solution in the test tube becomes cloudy after approximately 45 minutes of rotating in the water bath. After 6 hours of rotating in the water bath, the ball is still rolling. Normally, even if this experiment is continued after 6 hours, the ball continues to roll in the test tube even after a period of 24 hours. Therefore, the additive prevents the formation of a clathrate hydrate plug in the test tube over what is be a commercially significant period of time.

EXAMPLE 3

This example illustrates the use of Gaffix VC-713, as previously described, to control the formation and/or agglomeration of clathrate hydrates.

The experimental procedure of Example 1 is repeated, except that Gaffix VC-713 is added to the aqueous solution in an amount of 0.5 percent by weight, relative to water. After eight hours of rotating in the water bath, the solution in the test tube shows no signs of hydrate formation.

It should be recognized that any feature of any embodiment disclosed herein can be combined with any other feature of any other embodiment in any combination. Any additives can be used alone or in combination with one or more other additives. Any additive can be used as a primary additive or a secondary additive, While various embodiments of the present invention have been described in detail, it is apparent that modifications and adaptations of those embodiments will occur to those skilled in the art. It is to be expressly understood, however, that such modifications and adaptations are within the scope of the present invention.

What is claimed is:

1. A method for controlling clathrate hydrates in a fluid, the method comprising the steps of:
  providing a fluid comprising water and a guest molecule that is susceptible to formation of a clathrate hydrate;
  providing a first chemical compound;
  providing a second chemical compound; and
  contacting said fluid substantially simultaneously with said first chemical compound and said second chemical compound, said first chemical compound and said second chemical compound capable of reducing the tendency of clathrate hydrate masses that could exist in said fluid to grow or agglomerate into larger masses that could detrimentally interfere with flowing said fluid;

wherein, said first chemical compound comprises a polymer with a plurality of an organic ring having an amide linkage internal to the ring and said second chemical compound comprises an alcohol.

2. The method for controlling clathrate hydrates in a fluid as recited in claim 1, wherein:

said first chemical compound is a polymer having at least some repeating units of polymerization of an N-vinyl lactam.

3. The method for controlling clathrate hydrates in a fluid as recited in claim 1, wherein:

said organic ring comprises a 2-pyrrolidone ring.

4. The method for controlling clathrate hydrates in a fluid as recited in claim 1, wherein:

said organic ring comprises a δ-valerolactam ring.

5. The method for controlling clathrate hydrates in a fluid as recited in claim 1, wherein:

said organic ring comprises an ε-caprolactam ring.

6. The method for controlling clathrate hydrates in a fluid as recited in claim 1, wherein:

said second chemical compound is an alcohol that is soluble in water.

7. The method for controlling clathrate hydrates in a fluid as recited in claim 1, wherein:

said second chemical compound is selected from the group consisting of methanol, ethanol and ethylene glycol.

8. The method for controlling clathrate hydrates in a fluid as recited in claim 1, wherein:

said first chemical compound and said second chemical compound are mixed together prior to contacting said first chemical compound and said second chemical compound with said fluid.

9. A method for controlling clathrate hydrates in a fluid, the method comprising the steps of:

providing a fluid comprising water and a guest molecule that is susceptible to formation of a clathrate hydrate; and contacting said fluid with an additive capable of reducing the tendency of clathrate hydrate masses that could be present in said fluid to grow or agglomerate into larger masses that could detrimentally interfere with flowing said fluid;

wherein said additive comprises a copolymer having first repeating units of polymerization of N-vinyl-2-pyrrolidone and second repeating units of polymerization of N-vinyl-ε-caprolactam.

10. The method for controlling clathrate hydrates in a fluid as recited in claim 9, wherein:

said copolymer comprises greater than about 25 weight percent of said first repeating units.

11. The method for controlling clathrate hydrates in a fluid as recited in claim 9, wherein:

said copolymer comprises greater than about 50 weight percent of said first repeating units.

12. The method for controlling clathrate hydrates in a fluid as recited in claim 9, wherein:

said copolymer comprises greater than about 75 weight percent of said first repeating units.

13. The method for controlling clathrate hydrates in a fluid as recited in claim 9, wherein:

said additive further comprises an alcohol selected from the group consisting of methanol, ethanol and ethylene glycol.

14. A method for controlling clathrate hydrates in a fluid, the method comprising the steps of:

providing a fluid comprising water and a guest molecule that is susceptible to formation of a clathrate hydrate;

providing a first chemical compound;

providing a second chemical compound that is different than said first chemical compound; and contacting said fluid substantially simultaneously with said first chemical compound and said second chemical compound;

wherein said first chemical compound comprises a polymer with a plurality of a first constituent having a first organic ring having nitrogen as a hetero atom and said second chemical compound comprises a polymer with a plurality of a second constituent having a second organic ring, different than said first organic ring, with an amide linkage internal to said second organic ring.

15. The method for controlling clathrate hydrates in a fluid as recited in claim 14, wherein:

said first organic ring has an amide linkage internal to said organic ring.

16. The method for controlling clathrate hydrates in a fluid as recited in claim 14, wherein:

said first constituent and said second constituent are independently selected from the group consisting of a 2-pyrrolidone ring, a δ-valerolactam ring, and an ε-caprolactam ring.

17. The method for controlling clathrate hydrates in a fluid as recited in claim 14, wherein:

said second chemical compound further comprises a plurality of ionic groups.

18. The method for controlling clathrate hydrates in a fluid as recited in claim 14, wherein:

said first constituent has an amide linkage internal to said first organic ring, said first chemical compound further comprising a plurality of a third constituent comprising an ionic group.

19. The method for controlling clathrate hydrates in a fluid as recited in claim 18, wherein:

said first chemical compound comprises a polymer having repeating units of copolymerization of at least N-vinyl-ε-caprolactam, sodium 2-acrylamido-2-methyl-1-propane-sulfonate and acrylamide.

20. The method for controlling clathrate hydrates in a fluid as recited in claim 18, wherein:

said first, chemical compound is a polymer having repeating units of polymerization of N-vinyl-ε-caprolactam.

21. The method for controlling clathrate hydrates in a fluid as recited in claim 18, wherein:

said second chemical compound comprises a polymer selected for the group consisting of a homopolymer of N-vinyl-2-pyrrolidone, a homopolymer of N-vinyl-ε-caprolactam, and a copolymer of N-vinyl-2-pyrrolidone and N-vinyl-ε-caprolactam.

22. The method for controlling clathrate hydrates in a fluid as recited in claim 14, wherein:

a third chemical compound is contacted with said fluid substantially simultaneously with said first chemical compound and said second chemical compound, said third chemical compound comprising an alcohol selected from the group consisting of methanol, ethanol and ethylene glycol.

* * * * *